United States Patent
Pignataro et al.

(10) Patent No.: US 10,958,506 B2
(45) Date of Patent: Mar. 23, 2021

(54) IN-SITU OAM (IOAM) NETWORK RISK FLOW-BASED "TOPO-GRAM" FOR PREDICTIVE FLOW POSITIONING

(71) Applicant: Cisco Technology, Inc., San Jose, CA (US)

(72) Inventors: Carlos M. Pignataro, Cary, NC (US); Nagendra Kumar Nainar, Morrisville, NC (US); Rajiv Asati, Morrisville, NC (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 191 days.

(21) Appl. No.: 15/834,284

(22) Filed: Dec. 7, 2017

(65) Prior Publication Data

US 2019/0182103 A1  Jun. 13, 2019

(51) Int. Cl.
*H04L 12/24* (2006.01)
*H04L 12/851* (2013.01)

(52) U.S. Cl.
CPC .......... *H04L 41/0668* (2013.01); *H04L 41/12* (2013.01); *H04L 41/147* (2013.01);
(Continued)

(58) Field of Classification Search
CPC ................ H04L 41/0668; H04L 41/06; H04L 29/06034; H04L 41/14; H04L 41/147; H04L 47/24; H04Q 3/495
See application file for complete search history.

(56) References Cited

U.S. PATENT DOCUMENTS 8,433,667 B2  4/2013 Mahajan et al.
9,294,497 B1  3/2016 Ben-Or et al.
(Continued)

FOREIGN PATENT DOCUMENTS

CN  105960779 A  9/2016
EP  0854606 B1  10/2004

OTHER PUBLICATIONS

Zheng, et al., "Network Artificial Intelligence (NAI)", draft-zheng-opsawg-network-ai-usecases, draft-li-opsawg-network-ai-arch, OPSAWG, IETF 98, Chicago, Mar. 2017, 10 pgs.
(Continued)

*Primary Examiner* — Omer S Mian
(74) *Attorney, Agent, or Firm* — Edell, Shapiro & Finnan, LLC

(57) ABSTRACT

A system and method predict risks of failure or performance issues in a network to predictively position traffic flows in the network. For a traffic flow through a network, first data accumulated in a header of packets for the traffic flow is obtained, which header is populated by network elements along a path of the traffic flow through the network. Second data is obtained about the network in general including other network elements not along the path of the traffic flow. Machine learning analysis is performed to derive rules that characterize failure or performance risk issues in the network. The rules and topology data describing a topology of the network are applied to a model to create a topological graphical representation indicating failure or performance issues in the network that affect the traffic flow. A path for the traffic flow is modified based on the topological graphical representation.

20 Claims, 9 Drawing Sheets

(52) U.S. Cl.
CPC .............. *H04L 41/16* (2013.01); *H04L 47/24* (2013.01); *H04L 41/5025* (2013.01)

(56) References Cited

U.S. PATENT DOCUMENTS

| | | | |
|---|---|---|---|
| 9,338,065 B2 | 5/2016 | Vasseur et al. | |
| 9,369,351 B2 | 6/2016 | Di Pietro et al. | |
| 9,374,281 B2 | 6/2016 | Dasgupta et al. | |
| 9,426,040 B2 | 8/2016 | Vasseur et al. | |
| 9,473,364 B2 | 10/2016 | Vasseur et al. | |
| 9,485,153 B2 | 11/2016 | Vasseur et al. | |
| 9,491,076 B2 | 11/2016 | Mermoud et al. | |
| 9,774,522 B2 | 9/2017 | Vasseur et al. | |
| 2015/0195192 A1 | 7/2015 | Vasseur et al. | |
| 2015/0222557 A1* | 8/2015 | Bhattacharya | H04L 41/00 370/237 |
| 2015/0333953 A1* | 11/2015 | Vasseur | H04L 47/127 370/228 |
| 2017/0317780 A1* | 11/2017 | Wood | H04J 14/0286 |
| 2018/0034696 A1* | 2/2018 | Shahriar | G06F 9/45558 |
| 2018/0331890 A1* | 11/2018 | Song | H04L 41/08 |

OTHER PUBLICATIONS

Wu, et al., "Network Health Assessment—Using Big Data to Perform Network Diagnosis and Predict", IETF 97 Seoul, SDNRG meeting, Nov. 13-18, 2016, 14 pgs.

Song, Ed., et al., "Requirements for Interactive Query with Dynamic Network Probes", draft-song-opsa-dnp4iq-00, OPSAWG, https://www.ietf.org/archive/draft-song-opsa-dnp4iq-00.txt, Jun. 15, 2017, 17 pgs.

F. Brockners, et al., "Data Fields for In-situ OAM", draft-ietf-ippm-ioam-data-01, ippm, Oct. 30, 2017, 29 pgs.

F. Brockners, et al., "Data Fields for In-situ OAM", draft-ietf-ippm-ioam-data-00, ippm, Sep. 4, 2017, 29 pgs.

* cited by examiner

```
featureset (Class) {
    Node{
        time-of-date;
        Resource-Info {
        cpu;
        memory;
        linecard resource {
            rldi;
            cpu;
            memory;
            link{
                Egress-Attributes;  (Ex:  link Util)
                Connected nexthop Nodes;
                };
            };
        };
        Path Egress Nodes {
            Path Info;  (Ex: ECMP/UCMP Paths to each egress nodes)
                };
        Events;  (Ex: IGP, link etc)
        };
}
```

FIG.3

```
featureset {
    SLA {
        Critical
        {
            Classifier = { If DSCP = x|y|z OR TC = x|y|z OR so on}
            Flow-ID = {....}
                                    Path-Info = {
                                    Path;
                                    Transit-Delay;
                                    Transit-Jitter;
                                    Loss;
                                    }
            Ingress time = {};
            Egress time = {};
            End-to-End Delay;
            End-to-End Jitter;
            End-to-End Loss;
            Local-IGP events;
            etc;
        }
        Moderate
        {
            Classifier = { If DSCP = a|b|c OR TC = a|b|c OR so on}
            Flow-ID = {....}
            Path-Info = {
                                    Path;
                                    Transit-Delay;
                                    Transit-Jitter;
                                    Loss;
                                    }
            Ingress time = {};
            Egress time = {};
            End-to-End Delay;
            End-to-End Jitter;
            End-to-End Loss;
            Local-IGP events;
            etc;
        }
        Best-Effort
        {
            Classifier = { If DSCP = d|e|f OR TC = d|e|f OR so on}
            Flow-ID = {....}
            Path-Info = {
                                    Path;
                                    Transit-Delay;
                                    Transit-Jitter;
                                    Loss;
                                    }
            Ingress time = {};
            Egress time = {};
            End-to-End Delay;
            End-to-End Jitter;
            End-to-End Loss;
            Local-IGP events;
            etc;
```

FIG.4

IN-SITU OAM (IOAM) NETWORK RISK FLOW-BASED "TOPO-GRAM" FOR PREDICTIVE FLOW POSITIONING

TECHNICAL FIELD

The present disclosure relates to networking.

BACKGROUND

With the recent outburst of various use cases like Augmented/Virtual Reality and Autonomous Vehicles or other real-time medical applications, there is shift in radical expectation on a network from best effort based connectivity to mandatory Service Level Agreement (SLA) constrained connectivity with a defined set of SLA requirements in terms of delay, jitter, packet loss etc. Several milliseconds of delay in a medical application or autonomous vehicle may be life threatening and mandates that the network is not only reliable, but also dynamic and elastic to accommodate the SLA requirements.

Such robust network requirements shift the expectation on the network to be predictive and pre-emptive instead of being just proactive.

BRIEF DESCRIPTION OF THE DRAWINGS

FIGS. 3 and 4 are diagrams illustrate examples of data produced by the data collection and pre-processing operations depicted in FIG. 2, according to an example embodiment.

DESCRIPTION OF EXAMPLE EMBODIMENTS

Overview

Figure 1:
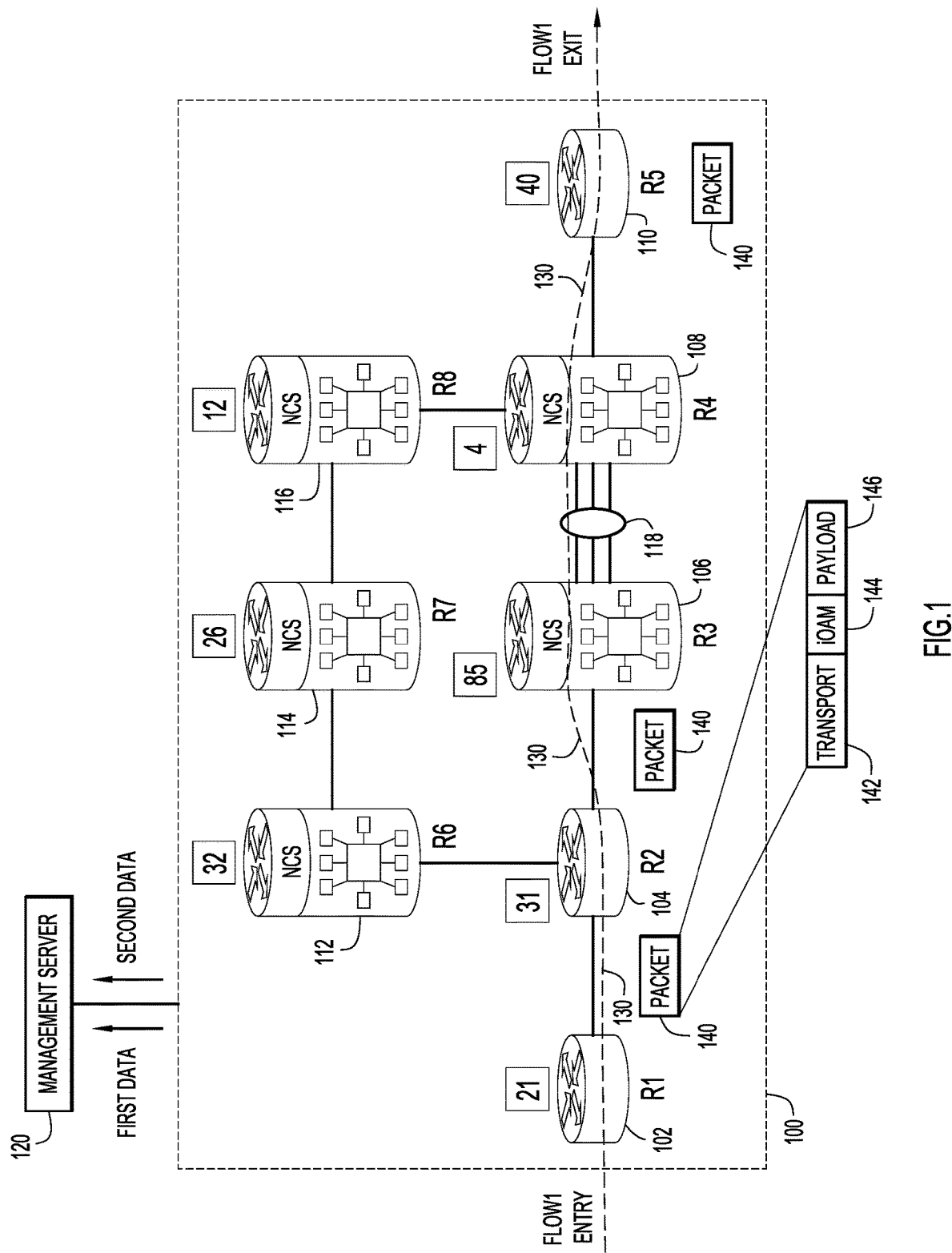
FIG. 1 is block diagram of a network in which a network risk and predictive flow positioning method may be employed, according to an example embodiment.

Briefly, a system and method are provided for predicting risks of failure or performance issues in a network to predictively position traffic flows in the network. For a traffic flow through a network, the method includes obtaining first data accumulated in a header of packets for the traffic flow. The header is populated by network elements along a path of the traffic flow through the network. The method includes obtaining second data about the network in general including other network elements not along the path of the traffic flow. The method involves deriving from the first data and the second data information describing operational attributes of individual network elements and attributes of service levels associated with traffic flowing through the network. The method includes a computing device analyzing the information to derive rules that characterize failure or performance risk issues in the network. The method includes the computing device applying the rules and topology data describing a topology of the network to a model to create a topological graphical representation indicating failure or performance issues in the network that affect the traffic flow. The method further includes modifying a path for the traffic flow based on the topological graphical representation.

Example Embodiments

Presented herein are techniques that employ a Machine Learning (ML) model and leverages the capability of in-situ Operations Administration and Management (IOAM) to stream real-time flow centric telemetry and use that to prescriptively position a network traffic flow in the best optimal path of the network that satisfies one or more constraints associated with the traffic flow. IOAM is recently adopted by the IETF The IP Performance Measurement (IPPM) Working Group (https://tools.ietf.org/html/draft-ietf-ippm-ioam-data-00 and https://datatrackerietforg/doc/draft-ietf-ippm-ioam-data/). These techniques may be used to predictively and pre-emptively predict occurrence of a failure event in the network to pre-emptively take measures to avoid the issue/event in the network.

IOAM inband telemetry is used to collect path information and other data in network traffic. The inband telemetry data is collected along the path of the traffic flow for a given user and the last hop node of that path extracts the inband data or sends it to a centralized server for analysis. There could be situations where the last hop node does some level of analysis and sends the results to a centralized server/agent, or the last hop node could send all of the inband data to a centralized server/agent that performs all the machine learning on the data.

The centralized server (or the last hop node) performs machine learning analysis of this data to create a "Topo-Gram" that is used to identify issues in the network that would affect a given traffic flow. A "Topo-Gram" is a linear topological graphical representation. It is akin a histogram but instead of time, it follows a multi-dimensional "axis" topological graphical representation. In other words, a "Topo-Gram" is a "histogram" but based on a topological graph or surface, instead of a linear "time" axis.

Reference is made to FIG. 1. FIG. 1 shows an example network 100 that includes a plurality of network elements ("nodes") through which there a multiple possible paths between an entry point and an exit point. Specifically, network 100 includes network elements 102, 104, 106, 108, 110, 112, 114 and 116. These elements are also given the names R1, R2, R3, R4, R5, R6, R7, and R8, respectively. A management server 120 is connected to network 100 and in communication with the network elements 102-116. The management server 120 may take the form of a network controller or a path computing element (PCE) for network 100. The network elements may be any of a variety of network elements including switches, routers, gateways, firewalls, etc. In one example, network elements 106, 108, 112, 114 and 116 are higher-capacity routers as compared to network elements 102-110. FIG. 1 also shows a link aggregation group 118 between routers 106 and 108. An example of link aggregation group technology is Cisco's virtual PortChannel (vPC) technology.

The network 100 is a simplified example for purposes of describing the techniques presented herein. An actual network deployment would have numerous more network elements, and possibly more entry and exit points.

The entry point to the network 100 for a flow is node 102 and the exit point is node 110. FIG. 1 shows the path 130 of a flow goes from R1 to R2 to R3 to R4 and then to R5.

The management server 120 is configured to receive data about the operational health of the network elements in network 100 and perform machine learning analysis of this data to create a "Topo-Gram". FIG. 1 shows that first data and second are sent from the network 100 to the management server 120. The first data is IOAM data that is accumulated in a header of packets for a given track flow and the header is populated by network elements along a path of the given traffic flow. The last hop node of the path, e.g., network element 110 (R5) in the example of FIG. 1, extracts the accumulated data from the header of a packet for the given flow, and sends that accumulated data (the first data) to the management server 120. In some embodiments, the last hop node may perform machine learning analysis on the accumulated data before sending processed data to the management server 120. The second data relates to the network 100 in general and includes information about network elements and links not along the path of the given traffic flow.

FIG. 1 shows a packet 140 of a given traffic flow, which after it enters the network, the entry point network element, e.g., network element 102 appends an IOAM header. Thus, the packet 140 that leaves network element 102 includes a transport header 142, an IOAM header 144 and a payload 146. Network element 102 will add data to the IOAM header, network element 104 will add further data to the IOAM header, network elements 106 and 108 will do the same, and network element 110 will receive the packet, add data to the IOAM header 144, and that extract all the IOAM data from the packet 140 before it is sent out of the network 100. Examples of metadata included within the IOAM header 144 are an identifier, timestamp, interfaces visited, queue depth etc., for each network element the packet traverses. As explained above, the network element 110 may send the extracted IOAM data (as the first data) to the management server 120, or the network element 110 may perform some analysis (e.g., machine learning processing) on the accumulated IOAM data before sending it to the server. The analysis performed by the network element 110 would be the same as that performed by the management server 120 (described in more detail below).

FIG. 1 shows an example of a Topo-Gram that includes a value on top of links, nodes, link aggregation groups or Equal Cost Multipath/Unequal Cost Multipath (ECMP/UCMP) groups, and represents a health index for the various parts of the network 100. For example, there is a "21" for network element 102, "31" for network element 104, "85" for network element 106, and so on. Reference is now made to subsequent figures for a description of how the Topo-Gram is generated and how it may be used.

Figure 2:
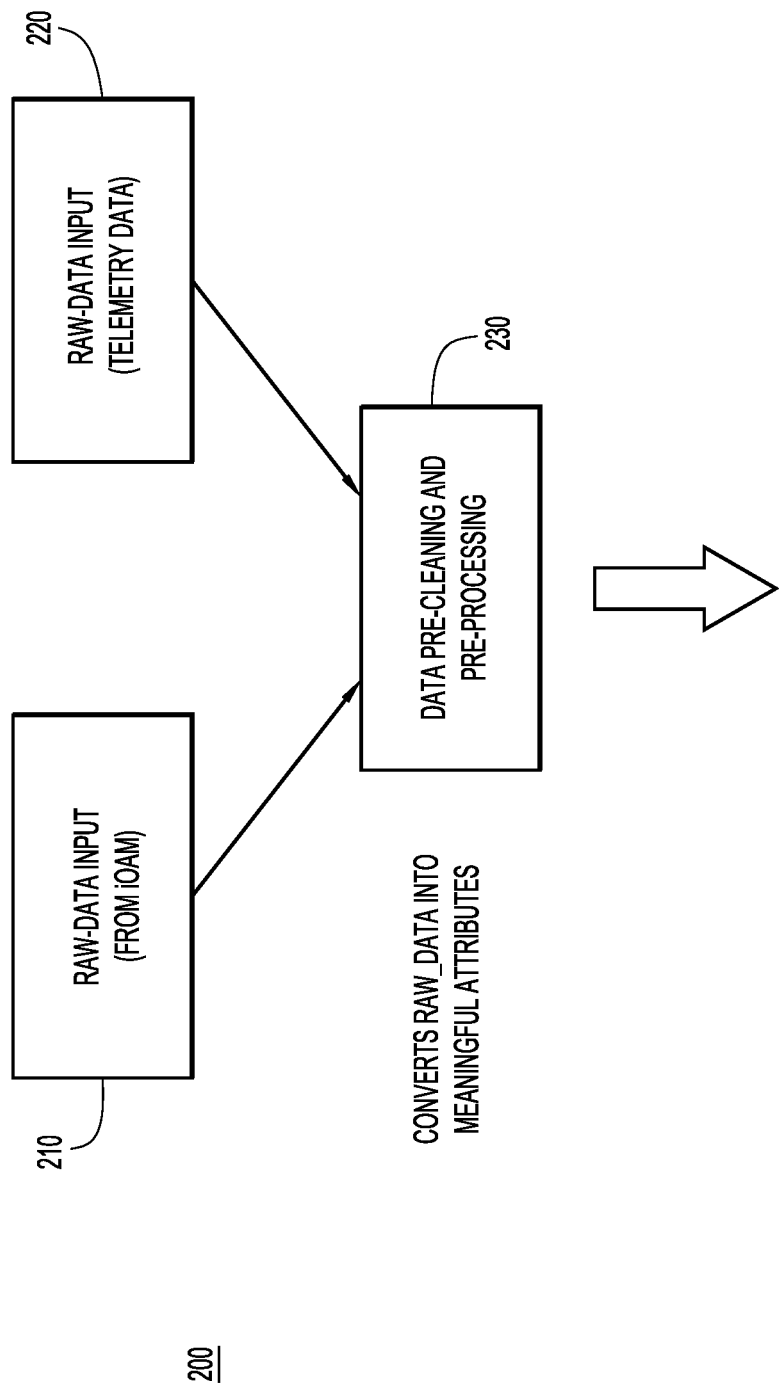
FIG. 2 is a flow chart illustrating data collection and pre-processing operations performed as part of the network risk and predictive flow positioning method, according to an example embodiment.

Reference is now made to FIG. 2, with continued reference to FIG. 1. FIG. 2 shows an operational flow 200 that depicts the collection of raw data for pre-processing before input into the machine learning analysis performed by the management server 120. At 210, the management server 120 collects raw-data input from IOAM headers of packets of a given flow. IOAM is one of the latest inband OAM mechanism that was initially proposed with focus on use cases such as a path detection and proof-of-transit. IOAM has evolved as an inband flow centric telemetry collection mechanism that allows for the collection various telemetry information from a specific path that a particular flow takes.

Thus, at 210, nodes along the path of a particular flow populate the IOAM header of packets of the flow with information about the packet flow, and the last hop node in the path sends the accumulated IOAM header information to the management server 120. This is the first data referred to in FIG. 1. Again, this IOAM header information is specific to a particular flow. It consist flow information and path information flow metrics for a particular flow. The extraction can happen at the flow tail-end, e.g., network element 110 where some machine learning analysis can be applied, and therefore a distributed machine learning process can evaluate and learn from it, without having to send the collected data to the central management server 120.

The IOAM capability is leveraged to collect flow centric telemetry information that for two purposes. First, it is used as a data-set fed into a machine learning algorithm. Second, it may be used as a trigger to predict any SLA deviation and redirect the flow path accordingly, as described further below.

The flows are classified into different SLA buckets. Flow classification can be based on Quality of Service (QoS) field, customer, address range etc., and the collected data are processed and created as QoS specific attributes.

At 220, telemetry data about the entire network in general is streamed to the management server 110. This is the second data referred to in FIG. 1. This data may come from the Interior Gateway Protocol (IGP), Border Gateway Protocol (BGP), Syslogs, link utility events, etc. from any nodes in the network, and not just from the nodes along the path of a particular/given flow. The network telemetry data is real-time data received from network elements concerning the operational state of the network elements and links therebetween in the network.

At 230, data pre-cleaning and pre-processing is performed on the IOAM flow-specific data obtained at 210 and the network-wide telemetry data obtained at 220, to convert the raw data into meaningful attributes.

Examples of feature sets of attributes that are the output of the operation 230 of FIG. 2 are shown in FIGS. 3 and 4. FIG. 3 shows an example of a feature/attribute set that describes attributes associated with a given node, including central processing unit (CPU) and memory of a node, as well as attributes of each linecard resource of a given node, including CPU, memory, link attributes (egress attributes, connected next hop nodes, etc.) and attributes of path egress nodes (path information such as ECMP/UCMP paths to each egress node, events (IGP, link, etc.).

FIG. 4 shows an example of a feature/attribute set that describes SLA related attributes. The SLA attributes are grouped by level, such as Critical, Moderate, and Best-Effort. For each SLA level, there is a classifier defined based on Differentiated Services Code Point (DSCP) or Traffic Class (TC), etc., flow identifier (Flow-ID), path information (Path-Info) including transit-delay, transit-jitter and loss parameters, as well as Ingress time, Egress time, End-to-End Delay, End-to-End Jitter, End-to-End Loss, Local-IGP events, etc.

Figure 5:
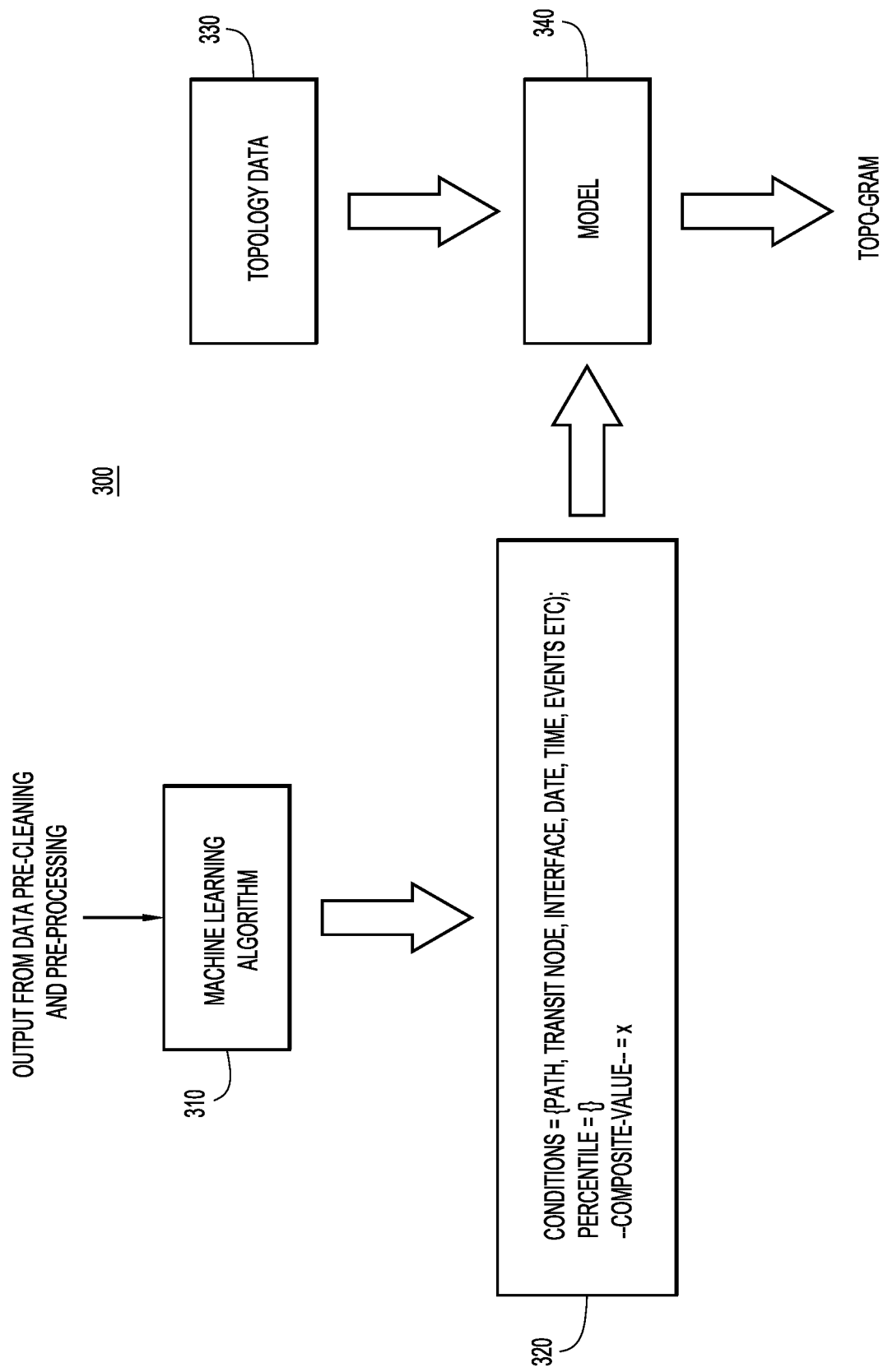
FIG. 5 is a flow chart illustrating machine learning and subsequent operations performed as part of the network risk and predictive flow positioning method, according to an example embodiment.

Reference is now made to FIG. 5. FIG. 5 shows a processing flow 300 after data-pre-cleaning pre-processing.

The output of the data-pre-cleaning pre-processing operation 230 in FIG. 2 is supplied to a machine learning algorithm at 310 to derive rules as shown at 320, specified in terms of Conditions, Percentile, and Composite-Value. In one example, the machine learning algorithm uses supervised learning with a multi-dimensional classification model. The resource information, path information and SLA information from IOAM and other data serve as the input to the machine learning algorithm 310 and the expected result (within SLA, violation, etc.). Depending on the number of occurrences with the same results, the number of matching attributes within the condition are used to determine the Percentile.

Conditions are composed of multiple variables which resulted in a Composite-Value. Conditions specify the conditions that occur. For example, as shown in FIG. 5, Conditions are specified in terms of Path, Transit Node, Interface, Date, Time, Events, etc.

Percentile specifies a percentage of the Conditions attributes that occur.

Composite-Value is a cumulative value of the number of occurrences that the Conditions attributes occur according to the percentile threshold.

One example rule derived may be:

```
(Condition1, Percentile, Color) where
    Condition1 =
    {
        (Path = R1_intf1, R5_intf7, R7_intf2, R3_intf3....)
        (link-load = load on each link)
        (SLA-Requirement = packet loss less than 1%)
        (time_of_date = y)
        ....
    }
    Percentile = (95 of the above attributes are true)
    Composite-Value = x
```

The above pseudocode is one simple representation. It also could be per-attribute (high weight for potential attributes) and a cumulative value is derived. When the Composite-Value exceeds a certain value, this means that a certain Percentile of the Conditions has occurred a sufficient number of times.

The above-derived rules, along with topology data about network, obtained at 330, are fed to a model at 340, to create a per-Flow Topo-Gram by correlating the learning from different flows. A Health Index numerical value is derived for each link/node based on the Conditions and the Composite-Value. For example, all the Conditions with a certain Composite-Value (more than 100, for example) are determined, and the common nodes/links are identified and given a "score" based on the number of occurrences, frequency of the appearance in newly learned Conditions (since this is an ongoing learning process). The machine learning algorithm defined at 310 creates the prediction rules from the telemetry data. The model at 340 use these prediction rules and applies the telemetry data to predict the issue (if any) and in order to take appropriate action. The topology data may be obtained with protocols, such as the Border Gateway Protocol (BGP) or any other network topology maintenance and reporting techniques now known or hereinafter developed.

For example, assume, every morning from 5-6 AM, there is a large volume of traffic on path1 (such as backup synchronization of data). Whenever there is a link failure on Node 1, Node 2 traffic is suffering with a SLA violation. The data from the network will be used at 310 to derive the rule:

Condition={attr1=Time_5to6_AM; attr2=Path1; attr3=Intf1_Node1_failure}, Percentile=100%, Composite-Value=100

A Composite-Value of 100 instructs the model at 340 that this rule had a lot of occurrences and so it is a potential rule to be used for prediction. The model 340 uses the telemetry data from the network. If Node 2 is showing indications of an interface failure, a check may be made as follows: Does it match attr1, attr2? (Percentile is 100% and so all attributes should match). If it does not match, then there is no SLA violation predicted on Node 1. If it does match, potential then there is a possibility for an SLA violation on Node 1. This is useful as an additional consideration as to whether to drive the traffic from Node 1 over a healthier path in the network.

This may be done for the next range of Composite-Value (50 to 100) and/or (10 to 50). Different Composite-Value ranges will have different meanings. A higher Composite-Value could mean low performance while a lower value could mean a high performance. Nodes commonly occurring on Conditions with a higher value will be given a reduced Health Index (negative value) while nodes occurring on Conditions with a lower composite value will be given a positive score. The cumulative value will be assigned as a Health Index for each link/node. A Composite-Value can be assigned for each learning and used as a benchmark to define when a rule is potentially considered a healthy rule for prediction. For example, a condition learned by just 2 occurrences will have less value while a condition learned by 50 occurrences will have more value. The range that is considered as healthy may vary depending on the algorithm, learning, operator etc.

Figure 6:
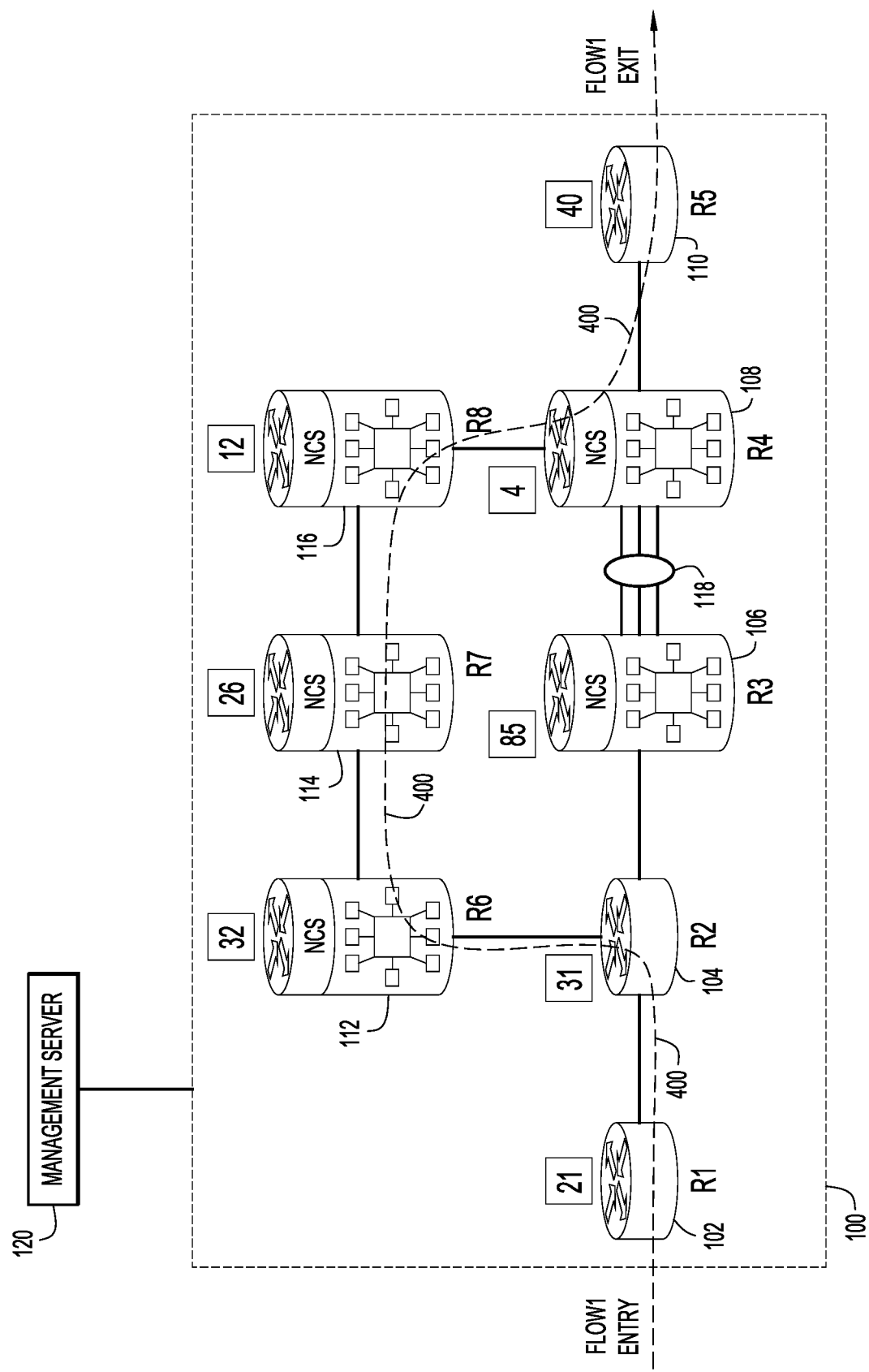
FIG. 6 is a block diagram of a network, similar to that shown in FIG. 1, but illustrating how a flow may be re-positioned in accordance with the network risk and predictive flow positioning method, according to an example embodiment.

Reference is now made to FIG. 6. FIG. 6 shows network 100, similar to that shown in FIG. 1, but further shows the use of the Topo-Gram. The Topo-Gram consists of the health indices assigned to nodes according to the techniques described above in connection with FIGS. 1-5. The Topo-Gram and flow requirements for a given traffic flow are used to predict a deviation that will negatively affect the given traffic flow, and thus indicate the need to redirect the traffic flow over other paths in the network that satisfy the SLA constraints for the given traffic flow. In the example topology of FIG. 6, the network element 106 has a health index of "85" indicating that it is predicted to experience a failure or performance event. The flow management server 120 detects this and immediately redirects the flow over another healthy path in the network, as such at reference numeral 400, though network elements R6, R7, R8 and back to R4 then R5. The management server 120 does not wait until a failure event occurs before triggering the protection mechanism. Numerous path redirecting techniques are known in the art that can be used.

The next time there is a requirement for a particular SLA (loss sensitive flow), the path will be derived based on the health index of the nodes. The troublesome spots (nodes or links) in the network are avoided for the path used for the flow. A path that has a better health index will be used.

Figure 7:
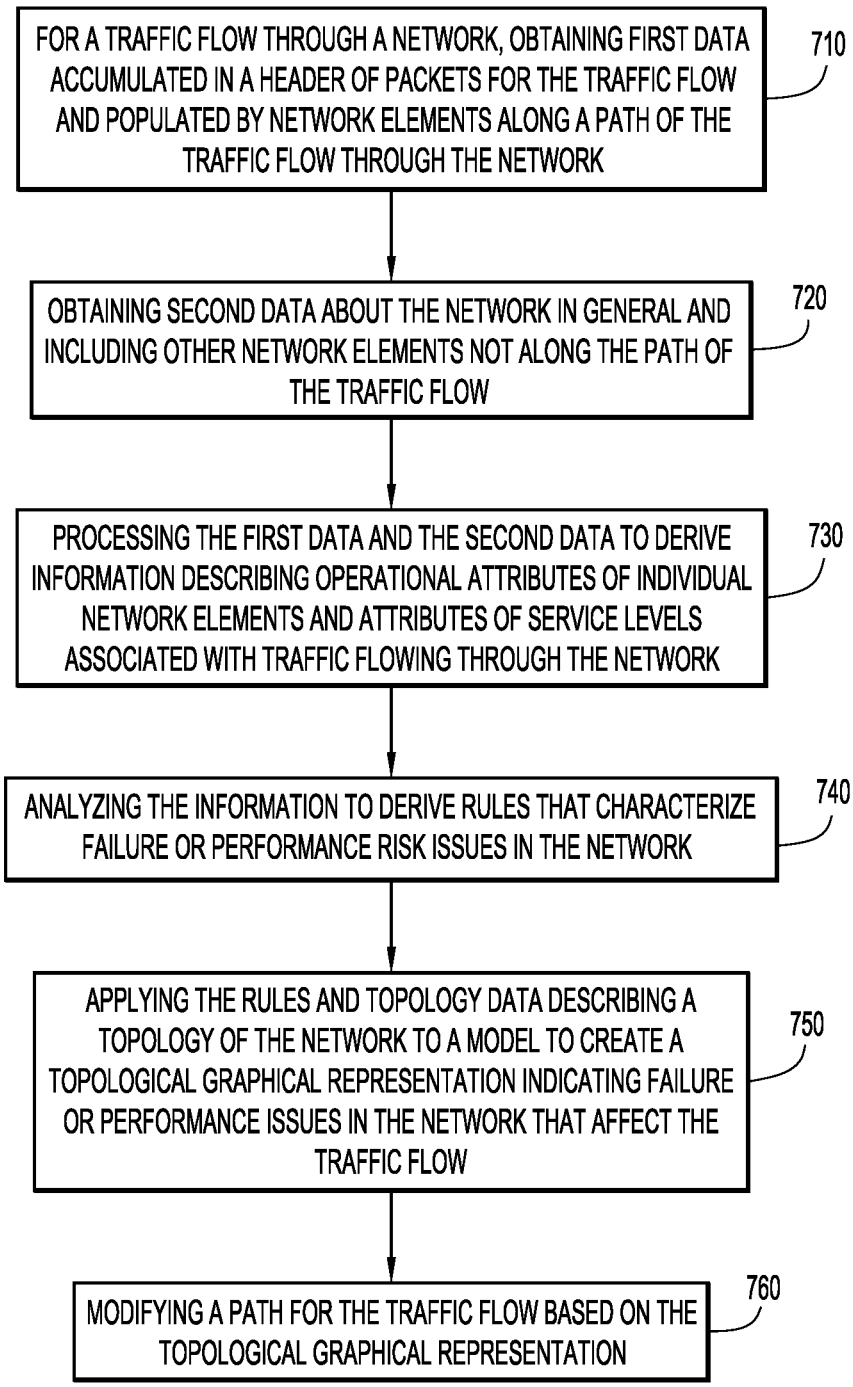
FIG. 7 is a flow chart illustrating an overall set of operations performed by the network risk and predictive flow positioning method, according to an example embodiment.

Reference is now made to FIG. 7. FIG. 7 illustrates a flow chart depicting a method 700 according to the embodiments presented herein. At 710, for a traffic flow through a network, a computing device (e.g., management server or network controller) obtains first data accumulated in a header of packets for the traffic flow, which header is populated by network elements along a path of the traffic flow through the network. At 720, the computing device obtains second data is obtained about the network in general including other network elements and links not along the path of the traffic flow. At 730, the computing device processes the first data and the second data to derive information describing operational attributes of individual network elements and attributes of service levels associated with traffic flowing through the network. In other words, at 730, the computing device derives from the first data and the second data information describing operational attributes of individual network elements and attributes of service levels associated with traffic flowing through the network. At 740, the computing device performs machine learning analysis on the information to derive rules that characterize failure or performance risk issues in the network. At 750, the computing device applies the rules and topology data describing a topology of the network to a model to create a topological graphical representation indicating failure or performance issues in the network that affect the traffic flow. At 760, the computing device modifies a path for the traffic flow based on the topological graphical representation.

The operation 710 of obtaining the first data may involve receiving the first data at a computing device from a last hop network element of the path that extracted the first data from the header of packets for the traffic flow, and wherein the processing operation 730, the performing machine learning analysis operation 740, the applying 750 and the modifying 760 are performed at the computing device. In an alternative form, the last hop node performs machine learning analysis on the first data prior to sending processed first data to the computing device for further processing at operations 730-760.

As described above in connection with FIGS. 3 and 4, the operation 730 of processing the first data and the second data to derive the information may include deriving at least a first attribute set and a second attribute set. The first attribute set describes operational attributes of individual network elements and the second attribute set describes service level related attributes.

The machine learning analysis performed at 740 may include deriving rules in terms of Conditions, Percentile and Composite-Value, where Conditions specify the network conditions that occur, Percentile specifies a percentage of the Conditions attributes that occur and Composite-Value is a cumulative value of the number of occurrences that the attributes occur according to the Percentile threshold.

As shown in FIGS. 1 and 6, the topological graphical representation includes a numerical value for each network element and for each link between network elements in the network, wherein a magnitude of the numeral value represents a level of failure or performance risk for the network element or link. Thus, the modifying operation 760 may involve selecting a new path for the traffic flow to avoid a network element or link whose numeral value indicates an unacceptable level of failure or performance risk.

Figure 8:
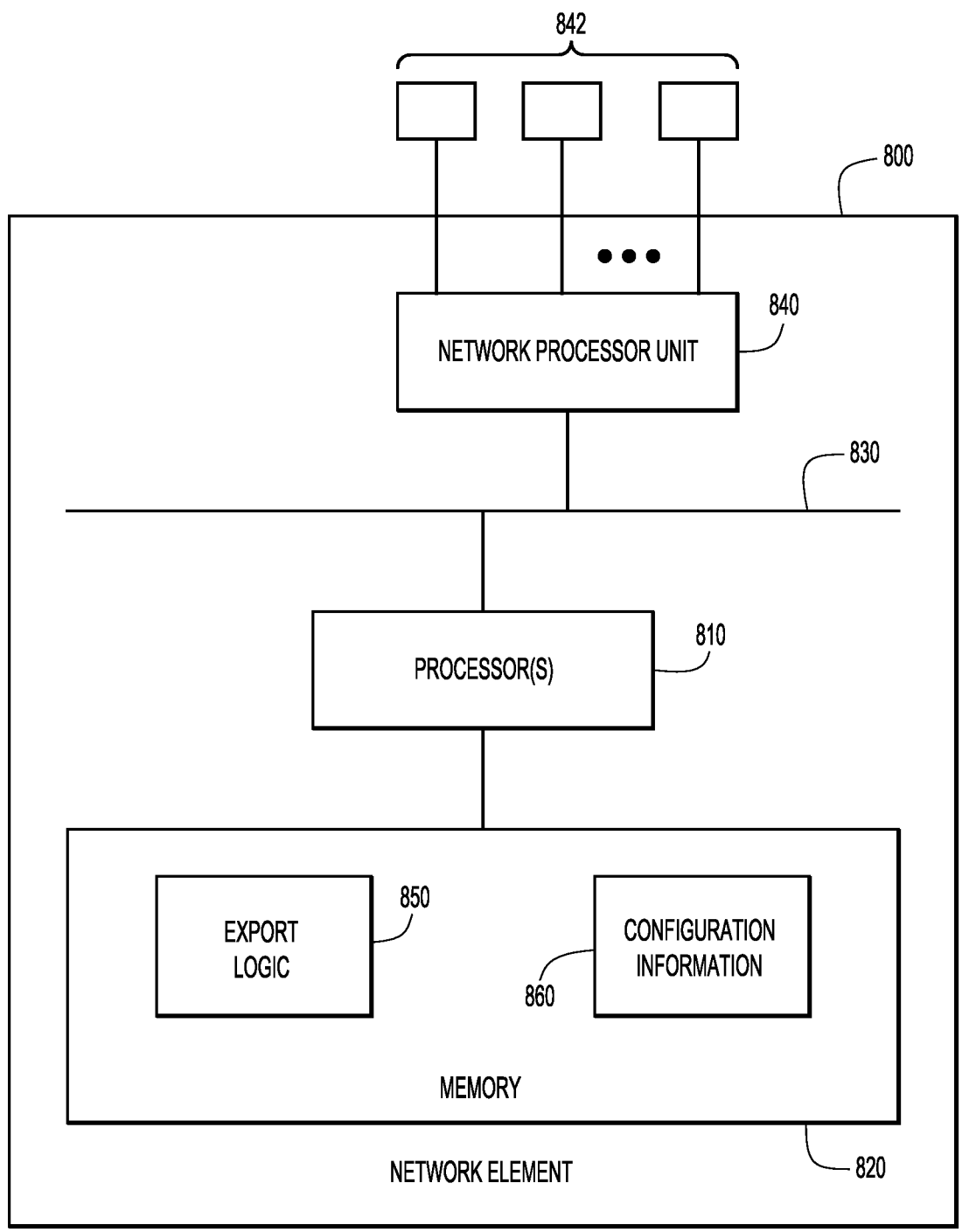
FIG. 8 is a block diagram of a network element configured to participate in the network risk and predictive flow positioning method, according to an example embodiment.

Reference is now made to FIG. 8. FIG. 8 illustrates a block diagram of a network element 800 configured to perform the operations described herein, e.g., any of the network elements referred to herein. The network element 800 includes one or more processors 810, memory 820, a bus 830 and a network processor unit 840. The processor 810 may be a microprocessor or microcontroller. The network processor unit 840 may include one or more Application Specific Integrated Circuits (ASICs) and performs networking features (switching, routing, etc.) between the network elements 800 and other network elements as well control plane communication with a management server/network controller. There are a plurality of network ports 842 at which the network element 800 receives packets and from which the network element 800 sends packets into the network. The processor 810 executes instructions associated with software stored in memory 820. Specifically, the memory 820 stores instructions for export logic 850 that, when executed by the processor 810, causes the processor 810 to perform the export of IOAM data. The memory 820 also stores configuration information 860 received from a management server/network controller to configure the network element according to desired network functions. It should be noted that in some embodiments, the export logic 850 may be implemented in the form of firmware that is processed by ASICs as part of the network processor unit 840.

The memory 820 may include read only memory (ROM) of any type now known or hereinafter developed, random access memory (RAM) of any type now known or hereinafter developed, magnetic disk storage media devices, tamper-proof storage, optical storage media devices, flash memory devices, electrical, optical, or other physical/tangible memory storage devices. In general, the memory 820 may comprise one or more tangible (non-transitory) computer readable storage media (e.g., a memory device) encoded with software comprising computer executable instructions and when the software is executed (by the processor 810) it is operable to perform the network node operations described herein.

Figure 9:
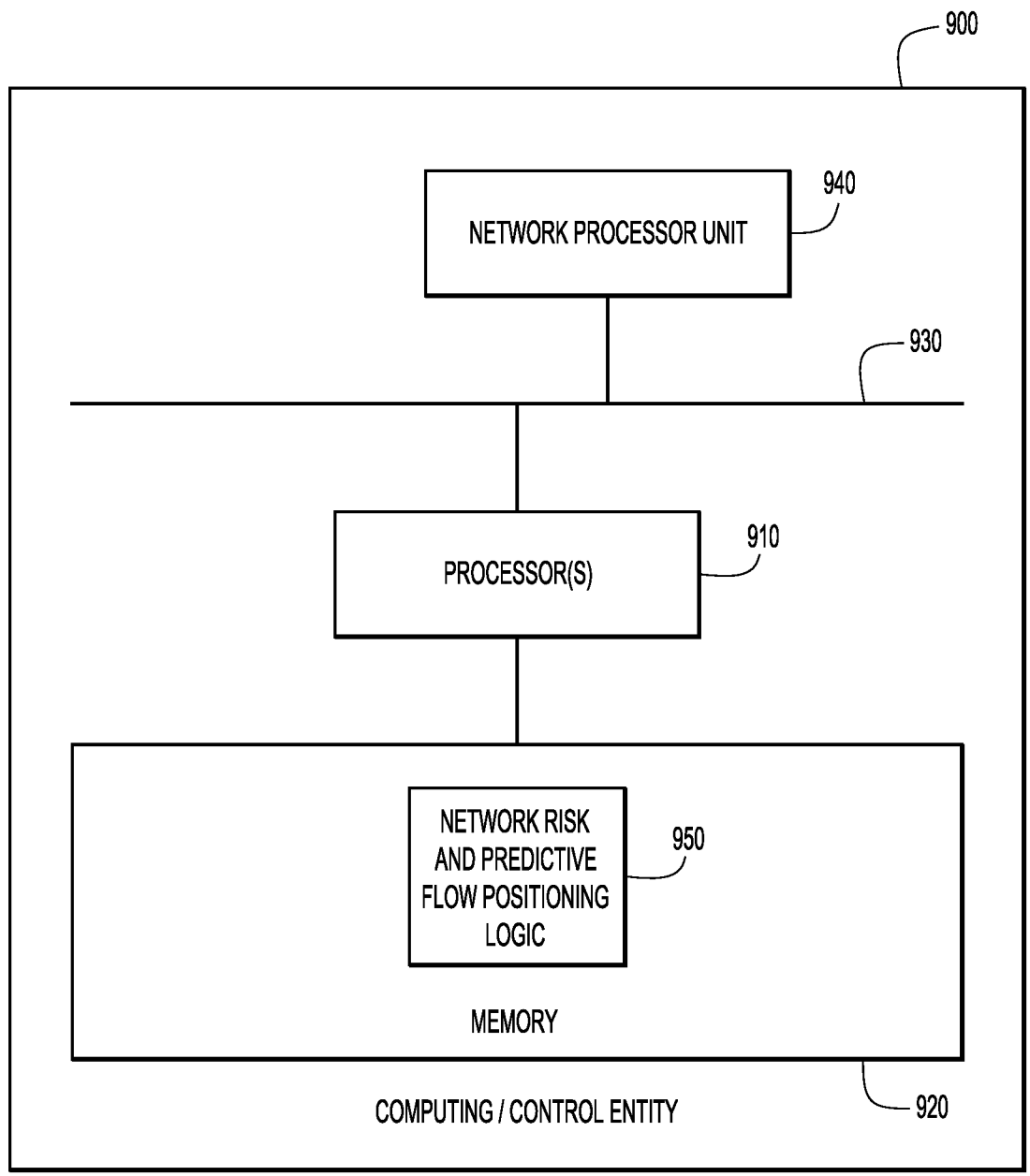
FIG. 9 is a block diagram of a management server configured to participate in the network risk and predictive flow positioning method, according to an example embodiment.

Reference is now made to FIG. 9. FIG. 9 illustrates a block diagram of a computing/control entity 900 that may perform the functions of the management server/network controller 120 described herein. The computing/control entity 900 includes one or more processors 910, memory 920, a bus 930 and a network interface unit 940, such as one or more network interface cards that enable network connectivity. The memory 920 stores instructions for network risk and predictive flow positioning logic 950, that when executed by the processor 910, cause the processor to perform the management server/network controller operations described herein in connection with FIGS. 1-7.

The memory 910 may include ROM of any type now known or hereinafter developed, RAM of any type now known or hereinafter developed, magnetic disk storage media devices, tamper-proof storage, optical storage media devices, flash memory devices, electrical, optical, or other physical/tangible memory storage devices. In general, the memory 920 may comprise one or more tangible (non-transitory) computer readable storage media (e.g., a memory device) encoded with software comprising computer executable instructions and when the software is executed (by the processor 910) it is operable to perform the operations described herein.

In summary, a flow-level granularity network risk assessment and predictive flow positioning mechanism is provided. Inband data telemetry is used to gather information about flow-based network operations. Machine learning is used, and in one form, the machine learning may be distributed at a flow tail-end (last hop) or at a processing device at an aggregation point. These techniques may be used to predict any SLA deviation and redirect the flow path accordingly. The concept of a "Topo-Gram" is created, which is a multi-dimensional topological graphical representation, and which has similarities to a "histogram" but is based on a topological graph or surface, instead of a linear "time" axis.

In summary, in one form, a method is provided comprising: for a traffic flow through a network, obtaining first data accumulated in a header of packets for the traffic flow, which header is populated by network elements along a path of the traffic flow through the network; obtaining second data about the network in general including other network elements not along the path of the traffic flow; deriving from the first data and the second data information describing operational attributes of individual network elements and attributes of service levels associated with traffic flowing through the network; analyzing the information to derive rules that characterize failure or performance risk issues in the network; applying the rules and topology data describing a topology of the network to a model to create a topological graphical representation indicating failure or performance issues in the network that affect the traffic flow; and modifying a path for the traffic flow based on the topological graphical representation In another form, a system is provided comprising: a network including a plurality of network elements, wherein for a traffic flow through the network, first data is accumulated in a header of packets for the traffic flow, which header is populated by network elements along a path of the traffic flow; a computing device in communication with the plurality of network elements, wherein the computing device is configured to: obtain the first data; receive second data about the network in general and including other network elements not along the path of the traffic flow; derive from the first data and the second data information describing operational attributes of individual network elements and attributes of service levels associated with traffic flowing through the network; analyze the information to derive rules that characterize failure or performance risk issues in the network; apply the rules and topology data describing a topology of the network to a model to create a topological graphical representation indicating failure or performance issues in the network that affect the traffic flow; and modify a path for the traffic flow based on the topological graphical representation.

In still another form, an apparatus is provided comprising: a network interface configured to enable network communication; a processor coupled to the network interface, wherein the processor is configured to: receive first data accumulated in a header of packets for a traffic flow, which header is populated by network elements in a network along a path of the traffic flow; receive second data about the network in general and including other network elements not along the path of the traffic flow; derive from the first data and the second data information describing operational attributes of individual network elements and attributes of service levels associated with traffic flowing through the network; analyze the information to derive rules that characterize failure or performance risk issues in the network; apply the rules and topology data describing a topology of the network to a model to create a topological graphical representation indicating failure or performance issues in the network that affect the traffic flow; and modify a path for the traffic flow based on the topological graphical representation.

In still another form, one or more non-transitory computer readable storage media are provided, encoded with instructions that, when executed by a processor, cause the processor to perform operations including: for a traffic flow through a network, obtaining first data accumulated in a header of packets for the traffic flow, which header is populated by network elements along a path of the traffic flow through the network; obtaining second data about the network in general including other network elements not along the path of the traffic flow; deriving from the first data and the second data information describing operational attributes of individual network elements and attributes of service levels associated with traffic flowing through the network; analyzing the information to derive rules that characterize failure or performance risk issues in the network; applying the rules and topology data describing a topology of the network to a model to create a topological graphical representation indicating failure or performance issues in the network that affect the traffic flow; and modifying a path for the traffic flow based on the topological graphical representation.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   for a traffic flow through a network, obtaining first data accumulated in a header of packets for the traffic flow, wherein the header of the packets is populated by network elements along a path of the traffic flow through the network;
   obtaining second data about the network in general including other network elements not along the path of the traffic flow;
   deriving, from the first data and the second data, information comprising a first set of attributes that includes describing operational attributes of individual network elements and a second set of attributes that includes attributes of service levels associated with traffic flowing through the network;
   analyzing the information to derive rules that characterize failure or performance risk issues in the network by performing machine learning analysis that includes deriving prediction rules in terms of conditions, percentile and composite-value, wherein the conditions specify network conditions that occur, the percentile specifies a percentage of conditions attributes that occur, and the composite-value is a cumulative value of a number of occurrences that the conditions attributes occur according to a percentile threshold;
   applying the rules and topology data describing a topology of the network to a model to create a topological graphical representation indicating failure or performance issues in the network that affect the traffic flow;
   predicting, from the topological graphical representation, a service level agreement related deviation for the path through the network; and
   modifying the path for the traffic flow based on the topological graphical representation prior to the service level agreement related deviation,
   wherein the topological graph representation includes a health index numerical value for each of the network elements based on the conditions with the composite-value such that modifying the path for the traffic flow based on the topological graphical representation includes redirecting the traffic flow to another path in the network based on the health index being below a threshold value, and
   wherein the first set of attributes includes, for each network element of the network, an equal cost multipath and an unequal cost multipath to each egress node, and the second set of attributes are grouped into different service levels, wherein each of the service levels has an associated classifier based on per-flow quality of service parameters.

2. The method of claim 1, wherein the second set of attributes describes service level agreement related attributes.

3. The method of claim 1, wherein the topological graphical representation further includes a numerical value for each link between the network elements in the network, wherein a magnitude of the numeral value represents a level of failure or performance risk for the link.

4. The method of claim 3, wherein modifying the path comprises selecting a new path for the traffic flow to avoid a network element or link whose numeral value indicates an unacceptable level of failure or performance risk.

5. The method of claim 1, wherein obtaining the first data comprises receiving the first data at a computing device from a last hop network element of the path that extracted the first data from the header of packets for the traffic flow, and wherein the deriving the information, the performing the machine learning analysis, the applying and the modifying are performed at the computing device.

6. The method of claim 5, further comprising a last hop network element performing machine learning analysis on the first data prior to sending the first data to the computing device.

7. The method of claim 1, wherein the first data includes identifiers of network elements, timestamps, interfaces visited, and queue depth.

8. A system comprising:
a network including a plurality of network elements, wherein for a traffic flow through the network, first data is accumulated in a header of packets for the traffic flow, wherein the header of the packets is populated by network elements along a path of the traffic flow;
a computing device in communication with the plurality of network elements, wherein the computing device is configured to:
obtain the first data;
receive second data about the network in general including other network elements not along the path of the traffic flow;
derive, from the first data and the second data, information comprising a first set of attributes that includes describing operational attributes of individual network elements and a second set of attributes that includes attributes of service levels associated with traffic flowing through the network;
analyze the information to derive rules that characterize failure or performance risk issues in the network by performing machine learning analysis that includes deriving prediction rules in terms of conditions, percentile and composite-value, wherein the conditions specify network conditions that occur, the percentile specifies a percentage of conditions attributes that occur, and the composite-value is a cumulative value of a number of occurrences that the conditions attributes occur according to a percentile threshold;
apply the rules and topology data describing a topology of the network to a model to create a topological graphical representation indicating failure or performance issues in the network that affect the traffic flow;
predict, from the topological graphical representation, a service level agreement related deviation for the path through the network; and
modify the path for the traffic flow based on the topological graphical representation prior to the service level agreement related deviation,
wherein the topological graphical representation includes a health index numerical value for each of the network elements based on the conditions with the composite-value such that modifying the path for the traffic flow based on the topological graphical representation includes redirecting the traffic flow to another path in the network based on the health index being below a threshold value, and
wherein the first set of attributes includes, for each network element of the network, an equal cost multipath and an unequal cost multipath to each egress node, and the second set of attributes are grouped into different service levels, wherein each of the service levels has an associated classifier based on per-flow quality of service parameters.

9. The system of claim 8, wherein the second set of attributes describes service level agreement related attributes.

10. The system of claim 8, wherein the topological graphical representation includes a numerical value for each link between the network elements in the network, wherein a magnitude of the numeral value represents a level of failure or performance risk for the link.

11. The system of claim 10, wherein the computing device is configured to modify by selecting a new path for the traffic flow to avoid a network element or link whose numeral value indicates an unacceptable level of failure or performance risk.

12. The system of claim 8, wherein the computing device is configured to receive the first data from a last hop network element of the path that extracted the first data from the header of packets for the traffic flow.

13. An apparatus comprising:
a network interface configured to enable network communication;
a processor coupled to the network interface, wherein the processor is configured to:
receive first data accumulated in a header of packets for a traffic flow, wherein the header of the packets is populated by network elements in a network along a path of the traffic flow;
receive second data about the network in general and including other network elements not along the path of the traffic flow;
derive, from the first data and the second data, information comprising a first set of attributes describing operational attributes of individual network elements and a second set of attributes that includes attributes of service levels associated with traffic flowing through the network;
analyze the information to derive rules that characterize failure or performance risk issues in the network by performing machine learning analysis that includes deriving prediction rules in terms of conditions, percentile and composite-value, wherein the conditions specify network conditions that occur, the percentile specifies a percentage of conditions attributes that occur, and the composite-value is a cumulative value of a number of occurrences that the conditions attributes occur according to a percentile threshold;
apply the rules and topology data describing a topology of the network to a model to create a topological graphical representation indicating failure or performance issues in the network that affect the traffic flow;
predict, from the topological graphical representation, a service level agreement related deviation for the path through the network; and modify the path for the traffic flow based on the topological graphical representation prior to the service level agreement related deviation;

wherein the topological graphical representation includes a health index numerical value for each of the network elements based on the conditions with the composite-value such that modifying the path for the traffic flow based on the topological graphical representation includes redirecting the traffic flow to another path in the network based on the health index being below a threshold value, and wherein the first set of attributes includes, for each network element of the network, an equal cost multipath and an unequal cost multipath to each egress node, and the second set of attributes are grouped into different service levels, wherein each of the service levels has an associated classifier based on per-flow quality of service parameters.

14. The apparatus of claim 13, wherein the second set of attributes describes service level agreement related attributes.

15. The apparatus of claim 13, wherein the topological graphical representation further includes a numerical value for each link between the network elements in the network; and wherein a magnitude of the numeral value represents a level of failure or performance risk for the link.

16. The method of claim 1, wherein obtaining the second data includes obtaining, from the other network elements, data concerning operational state of the other network elements and links in the network.

17. The method of claim 1, wherein modifying the path for the traffic flow based on the topological graphical representation includes redirecting the traffic flow to the another path in the network based on first health indexes of the network elements and second health indexes of the other network elements in the network.

18. The method of claim 1, wherein modifying the path for the traffic flow includes selecting a new path for the traffic flow to avoid a network element or link that indicates an unacceptable level of failure or performance risk, and wherein obtaining the first data includes receiving the first data at a computing device from a last hop network element of the path that extracted the first data from the header of packets for the traffic flow and applied machine learning analysis to the first data extracted from the header of the packets.

19. The method of claim 18, wherein obtaining the first data, obtaining the second data, deriving the information, analyzing the information, applying the rules, and predicting the service level agreement related deviation, are performed at the computing device.

20. The apparatus of claim 13, the processor is further configured to receive the first data from a last hop network element of the path that extracted the first data from the header of packets for the traffic flow.

* * * * *